United States Patent [19]

Dawson

[11] Patent Number: 5,206,294

[45] Date of Patent: Apr. 27, 1993

[54] THERMOPLASTIC POLYMER ALLOY COMPOSITION

[75] Inventor: Robert L. Dawson, Wilmington, Del.

[73] Assignee: E. I. du Pont de Nemours and Company, Wilmington, Del.

[21] Appl. No.: 788,622

[22] Filed: Nov. 6, 1991

[51] Int. Cl.⁵ .................. C08L 23/08; C08L 23/12; C08L 33/02; C08L 33/14

[52] U.S. Cl. .................. 525/196; 525/208; 525/221; 524/517

[58] Field of Search .................. 525/196, 221, 208

[56] References Cited

U.S. PATENT DOCUMENTS

| | | | |
|---|---|---|---|
| 3,835,201 | 9/1974 | Fischer | 525/211 |
| 4,871,810 | 10/1989 | Saltman | 525/221 |
| 4,945,005 | 7/1990 | Aleckner et al. | 525/196 |
| 4,968,752 | 11/1990 | Kawamoto et al. | . |
| 4,997,720 | 3/1991 | Bourbonais et al. | 525/221 |
| 5,051,478 | 9/1991 | Puydak et al. | . |

Primary Examiner—Carman J. Seccuro, Jr.
Attorney, Agent, or Firm—Marilyn H. Bromels

[57] ABSTRACT

Thermoplastic polymer alloy compositions are provided consisting of a blend of polypropylene, ethylene copolymer ionomer resin, ethylene/glycidyl acrylate or methacrylate copolymer, and uncrosslinked ethylene propylene rubber. The compositions are particularly useful in applications where a wide range of temperature and abrasive conditions are encountered.

11 Claims, No Drawings

THERMOPLASTIC POLYMER ALLOY COMPOSITION

BACKGROUND OF THE INVENTION

This invention relates to thermoplastic polymer alloy compositions which exhibit excellent low temperature properties coupled with heat and scuff resistance and to a process for producing such compositions.

For many years films and laminates of polyvinyl chloride (PVC) resins have found utility in the production of thermoformed articles including, for example, videotape cases, food packaging, and beverage containers. In the automotive field PVC has been employed extensively in the fabrication of interior sheathing for automobiles, for example, in instrument panel skins, door panels, roof liners, and seat covers. Although performance has been adequate, there are certain disadvantages inherently associated with use of PVC in these applications. In particular, large amounts of plasticizers must be incorporated into the resin in order to enhance flexibility and low temperature properties, as well as to provide a soft surface texture. However, as a result of the high temperatures to which the interiors of parked automobiles are subjected, the plasticizers have a tendency to migrate to the surface of the PVC films and consequently the PVC sheathing becomes brittle. In addition, a film of plasticizer is gradually deposited on the interior surfaces of the automobile, particularly on the interior surfaces of the windows.

A more recently recognized disadvantage of the use of PVC concerns the difficulty of disposal and recycle of the resin. Incineration results in generation of significant quantities of hydrogen chloride and heavy metal redidues. In addition, the resin is not compatible with other plastics used in the manufacture of automobiles, thereby creating problems during recycling operations.

Non-halogenated thermoplastic alloy compositions having good high temperature properties are known in the art, for example the polyolefin/ionomer blends disclosed in U.S. Pat. No. 4,871,810 or the blends of partially crosslinked ethylene/alpha-olefin copolymers with reaction products of ethylene copolymer ionomers and olefin/epoxy copolymers, disclosed in U.S. Pat. No. 4,968,752. Such compositions, however, are either deficient in softness of scuff resistance.

Consequently there is a need in the art, especially in the automotive field, for a material which combines the low and high temperature resistance properties of plasticized PVC, can be recycled easily, and exhibits scuff resistance and softness equal or superior to that of plasticized PVC.

SUMMARY OF THE INVENTION

In accordance with this invention thermoplastic alloys compositions are provided comprising a blend of
a) 10–40 wt. % polypropylene,
b) 15–50 wt. % uncrosslinked ethylene propylene copolymer rubber,
c) 20–60 wt. % of an ionomeric copolymer of ethylene and an alpha, beta-unsaturated $C_3$–$C_8$ carboxylic acid, and
d) 1–5 wt. % of a copolymer of ethylene and glycidyl acrylate or glycidyl methacrylate.
These compositions exhibit excellent high and low temperature properties, scuff resistance, and softness. Since they are non-halogenated and compatible with a wide variety of recyclable materials they are more environmentally acceptable than PVC.

The present invention is further directed to a process for preparing the thermoplastic alloy compositions, said process comprising melt blending
a) 10–40 wt. % polypropylene,
b) 15–50 wt. % uncrosslinked ethylene propylene copolymer rubber,
c) 20–60 wt. %of an ionomeric copolymer of ethylene and an alpha, beta-unsaturated $C_3$–$C_8$ carboxylic acid, and
d) 1–5 wt. % of a copolymer of ethylene and glycidyl acrylate or glycidyl methacrylate.

DETAILED DESCRIPTION OF THE INVENTION

The polypropylene component of the alloy compositions of the invention consists of crystalline polypropylene and is intended to include in addition to the homopolymer those polymers that also contain minor amounts, usually not greater than 15 weight percent, of higher alpha-olefins, e.g. those containing 3–8 carbon atoms, such as butene, octene, etc. The polypropylene polymers useful in this invention have melt indices in the range of from about 0.07–80 dg/minute and are present in the alloy composition in amounts of 10–40 percent by weight, preferably 20–30 percent by weight.

The alloy compositions also contain 20–60 percent by weight, preferably 30–50 percent by weight of an ionic copolymer of ethylene, an unsaturated $C_3$–$C_8$ carboxylic acid, and optionally, at least one softening comonomer that is copolymerizable with ethylene. Acrylic and methacrylic acids are preferred acid comonomers. The softening comonomer can be an alkyl acrylate selected from the group consisting of n-propyl-, n-butyl, n-octyl-, 2-ethylhexyl-, and 2-methoxyethyl-acrylates. The preferred alkyl acrylates are n-butyl-, 2-ethylhexyl-, and 2-methoxyethyl-acrylates. The softening comonomer can also be an alkyl vinyl ether selected from the group consisting of n-butyl, n-hexyl, 2-ethylhexyl-, and 2-methoxyethyl-vinyl ether. The preferred alkyl vinyl ethers are n-butyl vinyl ether and n-hexyl vinyl ether. The copolymer is about 10 to 70% neutralized with metal ions selected from groups Ia, Ib, IIa, IIIa, IVa, VIb, and VIII of the Periodic Table of Elements such as sodium, potassium, zinc, calcium, magnesium, lithium, aluminum, nickel, and chrominum. Preferably the copolymer has from about 35 to about 70% of the carboxylic acid groups ionized by neutralization with metal ions selected from the group consisting of sodium, potassium, zinc, calcium, and magnesium.

The thermoplastic polymer alloy contains about 1–5 weight %, preferably 2–3 weight %, of an ethylene/glycidyl acrylate or ethylene/glycidyl methacrylate copolymer. Optionally, and preferably, the ethylene/glycidyl acrylate or ethylene/glycidyl methacrylate copolymer contains copolymerized units of an alkyl acrylate or an alkyl methacrylate having 1–6 carbon atoms. The ethylene/glycidyl acrylate or ethylene/glycidyl methacrylate copolymer contains 60–88 weight percent ethylene and 1–12 weight percent glycidyl acrylate or glycidyl methacrylate. Representative alkyl acrylates and alkyl methacrylates that are used in the copolymer include methyl acrylate, ethyl acrylate, propyl acrylate, n-butyl acrylate, isobutyl acrylate, hexyl acrylate, methyl methacrylate, ethyl methacrylate, propyl methacrylate, butyl methacrylate, and hexyl methacrylate. Ethyl acrylate is preferred and n-butyl acrylate is especially preferred.

The ethylene/glycidyl (meth)acrylate, preferably containing an alkyl acrylate of 1-6 carbon atoms, can be prepared by direct polymerization, for example, copolymerizing ethylene, an alkyl acrylate, and glycidyl methacrylate or glycidyl acrylate in the presence of a free-radical polymerization initiator at elevated temperatures, generally 100°-270° C., usually 130°-230° C., and at elevated pressures, i.e. 140-350 MPa. The most preferred ethylene/glycidyl(methacrylate copolymers that are used in this invention are copolymers of ehtylene, ethyl acrylate, glydicyl methacrylate, and, especially, ethylene, n-butyl acrylate, and glycidyl methacrylate.

The thermoplastic polymer alloy contains about 15-50 weight percent, preferably 30-40 weight percent, of an uncrosslinked ethylene/propylene copolymer rubber, preferably an ethylene/propylene/nonconjugated diene copolymer (EPDM). The nonconjugated dienes can contain from 6-22 carbon atoms having at least one readily polymerizable double bond. The uncrosslinked ethylene/propylene copolymer rubber contains about 60-80 weight percent usually about 65-75 weight percent ethylene. The amount of nonconjugated diene is generally from about 1-7 weight percent, usually 2-5 weight percent. Preferably the ethylene/propylene copolymer rubbers are EPDM copolymers. EPDM copolymers that are especially preferred are ethylene/propylene/1,4- hexadiene, ehtylene/-propylene/dicylopentadiene, ethylene/propylene/norbornene, ethylene/propylene/methylene-2-norbornene, and ethylene/propylene/1,4- hexadiene/norbornadiene copolymers. It is important that the ethylene propylene copolymer rubber be non-crosslinked because this imparts enhanced scuff resistance to the polymer alloys.

The alloy compositions of the present invention are generally prepared by melt blending the polymeric components under high shear conditions, for example in an extruder. The various ingredients may first be combined with one another e.g., in a pellet blend, or they may be combined with one another via simultaneous or separate metering of the various components. They may also be divided and blended in one or more passes into separate sections of the mixing equipment.

The resultant compositions may be formed into sheets, or they may be molded into any desired shape. In particular, they may be thermoformed for use as instrument panel skins for automobiles. Excellent low temperature flexibility combined with scuff resistance, and high temperature resistance, enables these compositions to be useful in applications wherein a wide range of temperature and abrasive conditions are encountered.

EXAMPLES

The following tests were used to evaluate the compositions of the invention.

Melt Tension - Performed on a Gottfert Rheotens instrument used with a Gottfert Rheograph 2001 piston rheometer according to the standard procedures given in the instruction manuals for these pieces of equipment. The piston rheometer was run at 180° C. with a 2 mm diameter die 10 mm long at a head speed of 0.067 mm/sec. The Rheotens instrument was run at take-away speed starting at 1 cm/sec and then increasing at a rate of 1.2 cm/sec/sec until the strand broke.

Maximum Draw - Performed on the Gottfert Rheotens instrument described for the melt tension test. A strand of polymer is fed from the capillary rheometer through a set of grooved wheels at a rate of 1 cm/sec. Then the wheel speed is increased at a rate of 1.2 cm/sec/sec until the strand breaks. This test simulates the elasticity of the melt and allows one to assess the tendency for polymers to draw sufficiently for thermoforming.

Image - Injection molded disks ⅛ (3.2 mm) thick and 4 inches (10.2 cm) in diameter are placed on a Taber Abraser ® apparatus as described in ASTM D-1044 using CS-10 wheels and 500 g of weight. The sample is rotated 3 revolutions to simulate scuffing/scratching. The scuff pattern is then analyzed with a Quantimet Image Analyzer ® and a value computed which is the percent of sample area in the scuffed region which is marred. A low value, therefore, indicates small amounts of marring and a high level of scuff resistance.

Hardness - ASTM D-2240
Gardner Impact - ASTM D-4226
Flex Modulus - ASTM D-790
Tensile Strength - ASTM D-1708
Elongation at Break - ASTM D-1708

EXAMPLE 1

A mixture of 20 parts of polypropylene (melt index 4 g/10 minutes, ASTM D-1238, Condition L), 29 parts of an ethylene/propylene/1,4-hexadiene terpolymer (monomer ratio 70/26/4), 49 parts of a 45% neutralized zinc ionomer of ethylene/n-butyl acrylate/methacrylic acid terpolymer (monomer ratio 69.5/22/8.5; melt index 1.4 g/10 minutes, ASTM D-1238, Condition E), and 2 parts ethylene/n-butyl acrylate/glycidyl methacrylate terpolymer (monomer ratio 66.7/28/5.3, melt index 12.0 g/10 minutes) was placed in a polyethylene bag and tumble-mixed until a homogeneous blend was obtained. The resultant dry blend, Sample 1A, was melt blended in a Werner and Pfleiderer twin crew extruder having a diameter of 28 mm and a length to diameter ratio of 27.5. The screw used was a general purpose screw with vacuum capability which consisted of elements to convey the feed material from the feed zone to a melting zone in which the material was compressed and melting commenced. A further section of kneading blocks followed by reverse elements provided high shear and pressure to continue the melting and mixing processes. The reverse elements also served to provide a melt seal following which the melt was decompressed in a vacuum section. Following the vacuum zone the melt was recompressed and passed through kneading blocks and reverse elements which provided a second vacuum seal. The melt was then further compressed and mixed as it passed through the extruder and out the die. The extruder barrel and die were set at a temperature of 180° C. and the resin was extruded at a rate of 4-5 kg/hour. Temperature of the melt exiting the extruder die was 210° C. The melt strand exiting the extruder was quenched in water and cut into pellets. The pelletized product was used to prepare specimens for the physical tests listed in Table I.

A second sample, Sample 1B, similar to Sample 1A, except that the amounts of ethylene/propylene/1,4-hexadiene polymer and zinc ionomer were 48 parts and 30 parts, respectively, was prepared using the above-described mixing and melt blending procedures. Physical properties of Sample 1B are also shown in Table I.

TABLE I

| Ingredients | 1A | 1B |
|---|---|---|
| Polypropylene | 20 | 20 |
| EPDM[1] | 29 | 48 |
| Zn Ionomer[2] | 49 | 30 |
| E/nBA/GMA[3] | 2 | 2 |
| Physical Properties | | |
| Hardness, Shore D | 39 | 33 |
| Gardner Impact, −30° C., (J) | >36 | 31 |
| Melt Tension (cN) | 11.0 | 5.9 |
| Maximum Draw | 20.8 | 46 |
| Flex Modulus, (MPa) | 122.5 | 103.3 |
| Image (%) | 63 | 42 |
| Stress/Strain Properties, Original | | |
| $T_B$, (MPa) | 10.5 | 9.9 |
| $E_B$, (%) | 384 | 490 |
| Stress/Strain Properties, Heat Aged 3 Weeks @ 121° C. | | |
| $T_B$, (MPa) | — | 10.1 |
| $E_B$, (%) | — | 403 |

[1]70 ethylene/26 propylene/4 1,4-hexadiene
[2]29.5 ethylene/22 n-butyl acrylate/8.5 methacrylic acid, 45% neutralized with zinc
[3]66.7 ethylene/28 n-buty acrylate/5.3 glycidyl methacrylate

EXAMPLE 2

Two thermoplastic polymer alloy compositions, Samples 2A and 2B were prepared as follows. For Sample 2A, a mixture of 20 parts polypropylene (melt index 4 g/10 minutes), 27.7 parts of ethylene/propylene/1,4-hexadiene terpolymer (monomer ratio 70/26/4), 48 parts of 45% neutralized zinc ionomer of ethylene/n-butyl acrylate/methacrylic acid terpolymer (monomer ratio 69.5/22/8.5; melt index, 1.4, ASTM D-1238, Condition E), 2 parts ethylene/n-butyl acrylate/glycidyl methacrylate terpolymer (monomer ratio 66.7/28/5.3, melt index 12.0 g/10 minutes), and 3.3 parts of a carbon black concentrate (30% carbon black in polyethylene) was placed in a polyethylene bag and tumble-mixed until a homogeneous blend was obtained. For Sample 2B, a mixture of 20 parts of the polypropylene, 28 parts of the ethylene/propylene/1,4-hexadiene terpolymer, 48 parts of the ionomer resin, 2 parts of the ethylene/n-butyl acrylate/glycidyl methacrylate terpolymer, and 2 parts of Ampacet 19238 carbon black concentrate (45% carbon black in ethylen/methyl acrylate copolymer) was mixed as described above for Sample 2A. The resultant dry blends were individually melt blended in the Werner and Pfleiderer twin screw extruder described in Example 1, using substantially the same conditions. Physical properties of the resultant compositions are shown in Table II.

TABLE II

| Ingredients | 2A | 2B |
|---|---|---|
| Polypropylene | 20 | 20 |
| EPDM[1] | 27.7 | 28 |
| Zn Ionomer[2] | 48 | 48 |
| E/nBA/GMA[3] | 2 | 2 |
| Black #1[4] | 3.3 | — |
| Black #2[5] | — | 2.0 |
| Physical Properties | | |
| Hardness, Shore D | 40 | 39 |
| Gardner Impact, −30° C., (J) | 34.6 | 34.0 |
| Melt Tension (cN) | 9.5 | 11.4 |
| Maximum Draw | 20 | 21 |
| Flex Modulus, (MPa) | 148 | — |
| Image (%) | 47 | — |
| Stress/Strain Properties, Original | | |
| $T_B$, (MPa) | 12.0 | 10.6 |
| $E_B$, (%) | 175 | 349 |
| Stress/Strain Properties, Heat Aged 3 Weeks @ 121° C. | | |
| $T_B$, (MPa) | 13.0 | 12.7 |
| $E_B$, (%) | 473 | 465 |

[1]70 ethylene/26 propylene/4 1,4-hexadiene
[2]29.5 ethylene/22 n-butyl acrylate/8.5 methacrylic acid, 45% neutralized with zinc
[3]66.7 ethylene/28 n-buty acrylate/5.3 glycidyl methacrylate
[4]30% carbon black in polyethylene
[5]Ampacet 19238 carbon black concentrate

EXAMPLE 3

A mixture of 20 parts polypropylene (melt index 4 g/10 minutes), 45 parts of ethylene/propylene/1,4-hexadiene terpolymer (monomer ratio 70/26/4), 33 parts of a 71% neutralized zinc ionomer of ethylene/methacrylic acid copolymer (monomer ratio 90/10, melt index 1.1 g/10 minutes, ASTM D-1238, Condition E), and 2 parts ethylene/n-butyl acrylate/glycidyl methacrylate terpolymer (monomer ratio 66.7/28/5.3, melt index 12.0 g/10 minutes, ASTM D-1238, Condition E) was placed in a polyethylene bag and tumble-mixed until a homogeneous blend was obtained. The resultant dry blend, Sample 3A, was melt blended in the Werner and Pfleiderer twin screw extruder described in Example 1 using substantially the same conditions described therein.

Another sample, 3B, was prepared in the same manner, except that Sample 3B contained 29 parts of the ethylene/propylene/1,4- hexadiene terpolymer and 49 parts of the 71% neturalized zinc ionomer. Physical properties of the resultant compositions are shown in Table III.

TABLE III

| Ingredients | 3A[1] | 3B |
|---|---|---|
| Polypropylene | 20 | 20 |
| EPDM[2] | 45 | 29 |
| Zn Ionomer[3] | 33 | 49 |
| E/nBA/GMA[4] | 2 | 2 |
| Physical Properties | | |
| Hardness, Shore D | 41,41 | 50 |
| Gardner Impact, −30° C., (J) | 35.3,33.4 | >36 |
| Melt Tension (cN) | 7.1,5.3 | 11.0 |
| Maximum Draw | 40.0,78.0 | 35.0 |
| Flex Modulus, (MPa) | 187.9,157.4 | 211.8 |
| Image (%) | 42,31 | — |
| Stress/Strain Properties, Original | | |
| $T_B$, (MPa) | 11.2,11.9 | 17.4 |
| $E_B$, (%) | 408,376 | 377 |
| Stress/Strain Properties, Heat Aged 3 Weeks @ 121° C. | | |
| $T_B$, (MPa) | 14.7,11.0 | 21.9 |
| $E_B$, (%) | 409,268 | 387 |

[1]Data from two samples
[2]70 ethylene/26 propylene/4 1,4-hexadiene
[3]90 ethylene/10 methacrylic acid, 71% neutralized with zinc
[4]66.7 ethylene/28 n-butyl acrylate/5.3 glycidyl methacrylate

EXAMPLE 4

A mixture of 20 parts polypropylene (melt index 4 g/10 minutes), 44 parts of ethylene/propylene/1,4-hexadiene terpolymer (monomer ratio 70/26/4), 32 parts of a 71% neutralized zinc ionomer of ethylene/methacrylic acid copolymer (monomer ratio 90/10, melt index 1.1 g/10 minutes, ASTM D-1238, Condition E), 2 parts ethylene/n-butyl acrylate/glycidyl methacrylate terpolymer (monomer ratio 66.7/28/5.3, melt index 12.0 g/10 minutes, ASTM D-1238, Condition E), and 2 parts Ampacet 19328 carbon black concentrate was placed in a polyethylene bag and tumble-mixed until a homogeneous blend was obtained. The resultant dry blend, Sample 4, was melt blended in the Werner and Pfleiderer twin screw extruder described in Example 1 using substantially the same conditions described therein. Physical properties of samples of the resultant composition are shown in Table IV.

TABLE IV

| Ingredients | | |
|---|---|---|
| Polypropylene | 20 | 20 |
| EPDM[1] | 44 | 44 |
| Zn Ionomer[2] | 32 | 32 |
| E/nBA/GMA[3] | 2 | 2 |
| Carbon Black Conc. | 2 | 2 |
| Physical Properties | | |
| Hardness, Shore D | 41 | 43 |
| Gardner Impact, −30° C., (J) | 26.8 | 35.3 |
| Melt Tension (cN) | 7.2 | 6.9 |
| Flex Modulus, (MPa) | 142.9 | — |
| Maximum Draw | 48 | 45 |
| Image (%) | 34 | — |
| Stress/Strain Properties, Original | | |
| $T_B$, (MPa) | 12.7 | 12.3 |
| $E_B$, (%) | 361 | 391 |
| Stress/Strain Properties, Heat Aged 3 Weeks @ 121° C. | | |
| $T_B$, (MPa) | 15.8 | 12.6 |
| $E_B$, (%) | 436 | 367 |

[1] 70 ethylene/26 propylene/1,4-hexadiene
[2] 90 ethylene/10 methacrylic acid, 71% neutralized with zinc
[3] 66.7 ethylene/28 n-butyl acrylate/5.3 glycidyl methacrylate

What is claimed is:

1. A thermoplastic polymer alloy composition comprising a blend of
    a) 10–40 wt. % polypropylene,
    b) 15–50 wt. % uncrosslinked ethylene propylene copolymer rubber having an ethylene content of 60–80 wt. %,
    c) 20–60 wt. % of an ionomeric copolymer of ethylene and an alpha, beta-unsaturated $C_3$–$C_8$ carboxylic acid, and
    d) 1–5 wt. % of a copolymer of ethylene and glycidyl acrylate or glycidyl methacrylate.

2. The composition of claim 1 wherein the polypropylene is present in an amount of 20–30 wt. %.

3. The composition of claim 1 wherein the uncrosslinked ethylene propylene copolymer rubber is present in an amount of 25–35 wt. %.

4. The composition of claim 1 wherein the ionomeric copolymer of ethylene and an alpha, beta-unsaturated $C_3$–$C_8$ carboxylic acid is present in an amount of 30–50 wt. %.

5. The composition of claim 1 wherein the copolymer of ethylene and glycidyl acrylate or glycidyl methacrylate is present in an amount of 2–3 wt. %.

6. The composition of claim 1 wherein the ethylene propylene rubber is copolymer of ethylene, propylene, and 1,4-hexadiene.

7. The composition of claim 1 wherein the copolymer of ethylene and glycidyl acrylate or glycidyl methacrylate is an ethylene/n-butyl acrylate/glycidyl methacrylate copolymer.

8. A process for the preparation of a thermoplastic polymer alloy which comprises melt blending
    a) 10–40 wt. % polypropylene,
    b) 15–50 wt. % uncrosslinked ethylene propylene copolymer rubber having an ethylene content of 60–80 wt. %,
    c) 20–60wt. % of an ionomeric copolymer of ethylene and an alpha, beta-unsaturated $C_3$–$C_8$ carboxylic acid, and
    d) 1–5 wt. % of a copolymer of ethylene and glycidyl acrylate or glycidyl methacrylate.

9. A thermoformed instrument panel skin made from the composition of claim 1.

10. The composition of claim 1 wherein the ionomeric copolymer contains copolymerized units of an alkyl acrylate selected from the group consisting of n-propyl acrylate, n-butyl acrylate, n-octyl acrylate, 2-ethylhexyl acrylate, and 2-methoxyethyl acrylate.

11. The composition of claim 10 wherein the alkyl acrylate is n-butyl acrylate.

* * * * *